US008528704B2

(12) United States Patent
Hayes et al.

(10) Patent No.: US 8,528,704 B2
(45) Date of Patent: Sep. 10, 2013

(54) BED CASTOR AND BRAKE ASSEMBLY

(75) Inventors: Stephen Hayes, Dudley (GB); Stephen Hollyoak, Kingswinford (GB)

(73) Assignee: Huntleigh Technology Limited (GB)

( * ) Notice: Subject to any disclaimer, the term of this patent is extended or adjusted under 35 U.S.C. 154(b) by 1447 days.

(21) Appl. No.: 11/995,976

(22) PCT Filed: Jul. 17, 2006

(86) PCT No.: PCT/GB2006/002647
§ 371 (c)(1),
(2), (4) Date: Jun. 30, 2008

(87) PCT Pub. No.: WO2007/010229
PCT Pub. Date: Jan. 25, 2007

(65) Prior Publication Data

US 2008/0264733 A1 Oct. 30, 2008

(30) Foreign Application Priority Data

Jul. 20, 2005 (GB) .................................. 0514926.5
Nov. 14, 2005 (GB) .................................. 0523170.9

(51) Int. Cl.
*B60B 33/00* (2006.01)

(52) U.S. Cl.
USPC ............... 188/1.12; 188/10; 188/19; 188/2 F; 188/21; 5/600; 5/86.1

(58) Field of Classification Search
USPC ................... 188/10, 19, 2 F, 21, 1.12; 5/600, 5/86.1; 16/35 R
See application file for complete search history.

(56) References Cited

U.S. PATENT DOCUMENTS 263,057 A * 8/1882 Nathanson ...................... 188/10
1,750,904 A * 3/1930 Rouanet ........................ 188/194
3,013,281 A 12/1961 Steiner (Continued)

FOREIGN PATENT DOCUMENTS

DE 35 16 081 A1 11/1986
DE 199 12 335 A1 9/2000

(Continued)

*Primary Examiner* — Robert A Siconolfi
*Assistant Examiner* — Mahbubur Rashid
(74) *Attorney, Agent, or Firm* — Craig A. Fieschko, Esq.; DeWitt Ross & Stevens S.C.

(57) ABSTRACT

A pedal (10) is formed from a single molding and includes first and second arms (12, 14), each provided with an over molded marker (16, 18). The pedal (10) has two fittings (20, 22) for coupling with a brake actuator rod (24) and a coupling member (26) respectively. A castor (40) includes a wheel (42) which can rotate about a bushing (44) and a coupling shaft (46). Within the shaft (46) there is provided a brake mechanism for locking the wheel (42). A base frame (80) for a bed includes longitudinal and transverse struts (52, 54) arranged in a rectangular form, with four castors (40) and four associated pedal assemblies (10). Two actuator rods (24) are provided, one for each pair of opposing pedal assemblies (10), while two connecting elements (26) are provided, one for each pair of side-by-side pedal assemblies (10). All the pedals and thus all the brake mechanisms are coupled to one another through the two actuator rods (24) and two coupling elements (26). When one pedal (10) is actuated all the castors will either be locked or will all be released by a single operation.

14 Claims, 3 Drawing Sheets

(56) References Cited

U.S. PATENT DOCUMENTS

| | | | |
|---|---|---|---|
| 3,051,965 | A | 9/1962 | Szemplak et al. |
| 3,209,379 | A | 10/1965 | Reinhold |
| 3,355,695 | A | 11/1967 | Overesch |
| 4,183,015 | A | 1/1980 | Drew et al. |
| 4,439,879 | A * | 4/1984 | Werner ............................. 5/600 |
| 4,759,098 | A * | 7/1988 | Ko .................................... 16/29 |
| 4,805,265 | A | 2/1989 | Ehm et al. |
| 5,141,241 | A * | 8/1992 | Avila ....................... 280/47.371 |
| 5,377,372 | A * | 1/1995 | Rudolf et al. ..................... 5/600 |
| 5,398,357 | A | 3/1995 | Foster et al. |
| 5,402,864 | A * | 4/1995 | Block et al. ..................... 188/19 |
| 5,634,532 | A | 6/1997 | Bucher et al. |
| 5,732,423 | A | 3/1998 | Weismiller et al. |
| 5,862,551 | A | 1/1999 | Oguma et al. |
| 5,987,673 | A | 11/1999 | Smith |
| 6,212,713 | B1 | 4/2001 | Kuck et al. |
| 6,286,184 | B1 * | 9/2001 | Dean et al. .................... 16/35 R |
| 6,321,878 | B1 | 11/2001 | Mobley et al. |
| 6,389,622 | B1 | 5/2002 | Her et al. |
| 6,486,792 | B1 | 11/2002 | Moster et al. |
| 6,505,365 | B1 | 1/2003 | Hanson et al. |
| 6,789,280 | B1 | 9/2004 | Paul |
| 7,406,729 | B2 | 8/2008 | Hornbach et al. |
| 7,533,429 | B2 | 5/2009 | Menkedick et al. |
| 2001/0011393 | A1 | 8/2001 | Brooke et al. |
| 2002/0178502 | A1 | 12/2002 | Beasley et al. |
| 2004/0177443 | A1 | 9/2004 | Simmonds et al. |
| 2004/0181876 | A1 | 9/2004 | Takeuchi |
| 2004/0200646 | A1 | 10/2004 | Waters et al. |
| 2005/0028281 | A1 | 2/2005 | Ooyama et al. |
| 2005/0039263 | A1 | 2/2005 | Reed et al. |
| 2007/0220677 | A1 | 9/2007 | Dewert |

FOREIGN PATENT DOCUMENTS

| | | | |
|---|---|---|---|
| DE | 101 41 491 | A1 | 3/2003 |
| EP | 0 381 293 | A | 8/1990 |
| EP | 0 561 749 | A | 9/1993 |
| EP | 0 788 786 | A2 | 8/1997 |
| EP | 1 408 190 | A | 4/2004 |
| EP | 1 435 211 | A | 7/2004 |
| FR | 2 711 520 | A | 5/1995 |
| GB | 603 530 | A | 6/1948 |
| GB | 1 134 417 | A | 11/1968 |
| GB | 2 311 000 | A | 9/1997 |
| WO | 96/01066 | A | 1/1996 |
| WO | 98/11858 | A | 3/1998 |
| WO | 2004/107923 | A | 12/2004 |

* cited by examiner

BED CASTOR AND BRAKE ASSEMBLY

FIELD OF THE INVENTION

The present invention relates to a bed castor and brake assembly for a bed, in particular a hospital bed.

BACKGROUND OF THE INVENTION

As it is often necessary to move hospital beds around a ward and also around a care home, such beds are typically provided with castors. Of course, a wheeled bed must be provided with a braking system to ensure that the bed can be set in one position. Many known hospital beds are provided with castors having integral brake mechanisms. A known castor of this type is provided with a cam coupled to a brake pad, the cam being rotatable to engage the brake pad with or to disengage the brake pad from a wheel of the castor. The cam and brake pad are typically provided internally of a connecting shaft of the castor.

As all four corners of such beds are typically provided with castors, it is not sufficient to brake a single castor. In practice, it is a requirement for all four castors to be braked. Of course, engaging the brake on all four castors separately can be difficult and systems have therefore been developed to link the braking systems of the castors together. Such systems are, however, complex in design.

The braking systems for such beds are typically provided with one or more pedals. As will be appreciated, such pedals are much used and often used hard, particularly in a hospital environment. It is not uncommon for the pedals to break or for components to come loose. This compromises the usability of the devices and often the safety and efficiency of the braking system.

SUMMARY OF THE INVENTION

The present invention seeks to provide an improved brake pedal or improved castor and brake assembly and an improved hospital bed.

According to an aspect of the present invention, there is provided a pedal for a brake assembly of a bed, the pedal being provided with an integral fitting for a brake component and with an integral fitting for a coupling member for coupling different brake mechanisms together.

Prior art pedals have provided fittings for only the brake components, any coupling to other brake mechanisms being provided by non-integral fittings. This complicates the brake assembly by requiring additional components and by increasing the chances of failure and possible locations for collection of dirt and germs.

Preferably, the brake fitting and the coupling member fitting are spaced from one another on the pedal. This provides for the pedal to exhibit both a rotating and a cam action for the two fittings.

Advantageously, the pedal is a moulded component. Preferably, the pedal is made from a plastics material.

In the preferred embodiment, the pedal includes at least one marker, the or each marker being over moulded on the pedal during moulding thereof. The feature of over moulding markers has the advantage of providing a much stronger coupling of markers to the pedal than is possible with glue and the like, as is used in prior art are devices. This can be particularly important where the markers are intended to indicate brake engaged and brake disengaged conditions.

It is preferred that all markers and labels provided on the bed are over moulded to the part to which they are attached.

According to another aspect of the present invention, there is provided a brake assembly for a bed including a plurality of pedal members as specified herein, at least one coupling member fittable to at least two adjacent pedals and operable to transfer to one pedal a motion corresponding to a motion imparted to the other or another pedal, and a brake mechanism coupled to the brake fittings of the pedals.

Advantageously, the assembly provides at least four pedals, arranged in opposing and side-by-side manner, pedals lying side-by-side being coupled together by said coupling members and pedals in opposing relationship being coupled together by a common brake actuator. In this arrangement, all the pedals can be coupled to one another, such that actuation of a single pedal will move all the interconnected pedals.

Preferably, the assembly includes a castor associated with each pedal, each castor including a brake pad coupled to the brake actuator.

According to another aspect of the present invention, there is provided a frame assembly for a bed including a brake assembly as herein specified, the frame assembly including a frame including fittings for receiving a plurality of castors and fittings for holding a plurality of pedals, at least one hollow strut member of the frame being provided for coupling opposing pedals such that the common brake actuator can pass though the hollow strut.

It is preferred that the or each coupling member for coupling together pedals lying in side-by-side manner is provided outside the frame struts, preferably disposed alongside an associated strut. This arrangement, it has been found, is advantageous in allowing a simpler structure and allowing a greater range of movement of the connecting member than would be possible with a connecting member located within a hollow strut of the frame.

According to another aspect of the present invention, there is provided a bed including a frame assembly as herein specified.

BRIEF DESCRIPTION OF THE DRAWINGS

Embodiments of the present invention are described below, by way of example only, with reference to the accompanying drawings, in which.

DETAILED DESCRIPTION OF PREFERRED EMBODIMENTS OF THE INVENTION

Figure 1:
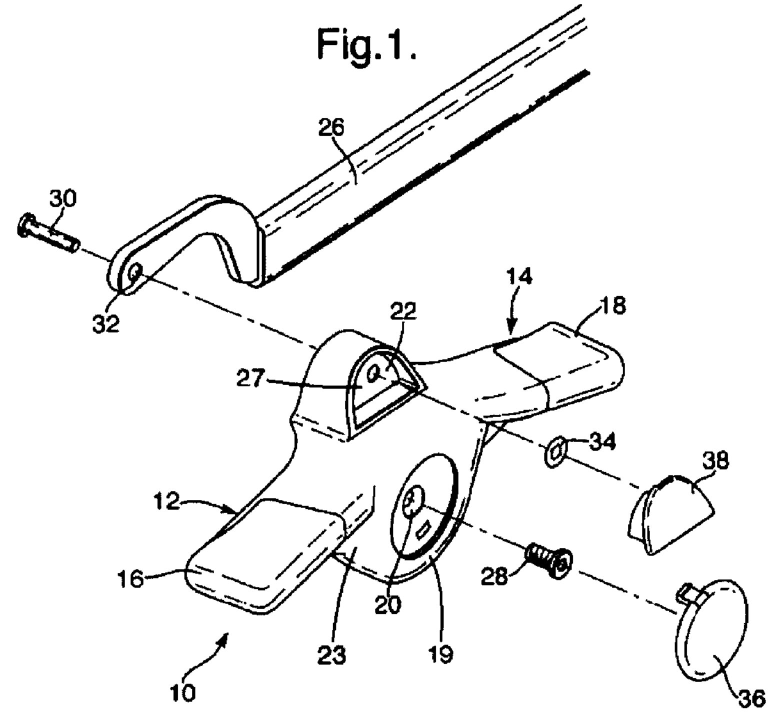
FIG. 1 is a perspective view in exploded form of an embodiment of pedal and showing part of an embodiment of connecting member.
Figure 2:
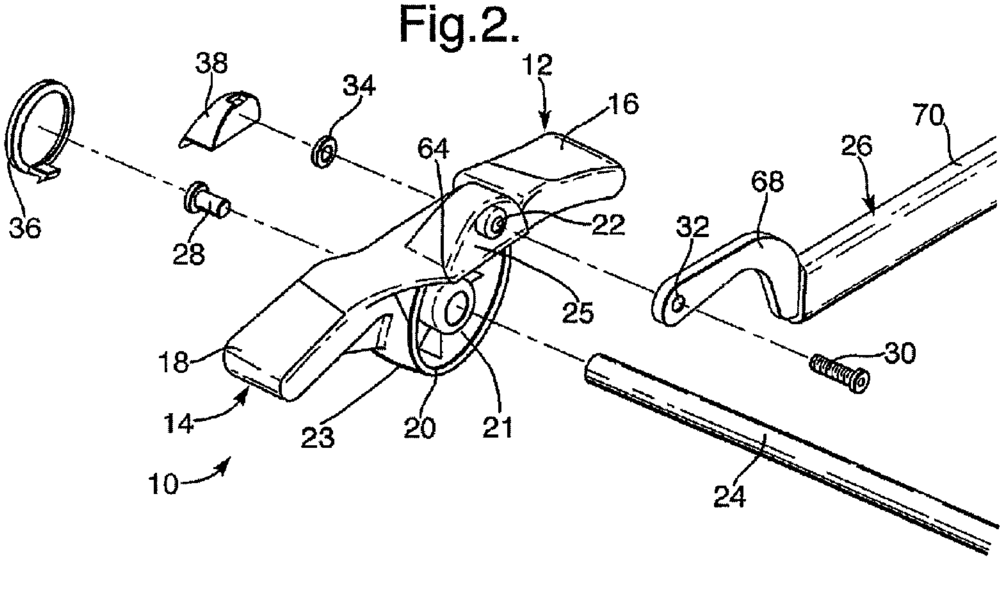
FIG. 2 is a perspective view in exploded form of the pedal of FIG. 1, from the other side, and showing part of a brake actuator frame assembly.

Referring to FIGS. 1 and 2, an embodiment of pedal 10 for a bed brake assembly is shown. The pedal 10 is preferably formed from a single moulding of a suitably strong plastics material and includes first and second arms 12, 14, each provided in this embodiment with a marker 16, 18. The markers 16, 18 are in this example coloured covers, one in red and the other in green, to denote states of brake applied and brake released. These marker types are in common use in the industry. In this embodiment, the markers 16, 18 are over moulded on the pedal 10, thereby forming in practice a single unitary structure. This structure has much greater longevity and strength than those which have markers which are, for example, glued onto the pedal or fitted by some form of snap or interference fit.

The pedal 10 is provided with two fittings 20, 22 for coupling with a brake actuator 24 and a coupling member 26 respectively. In this embodiment, the brake actuator 24 is of a type commonly used in the art, being a rod with a hexagonal transverse cross section. The fitting 20 in the preferred embodiment provides a hexagonal bore into which the actuator 24 is a tight fit. The front (outer) side 19 of the first fitting 20 also provides an aperture (as seen in FIG. 1) to allow the passage of a bolt 28 whose threaded shank engages a corresponding threaded bore (not shown) in the end of the actuator 24. The brake actuator 24 extends from the concave rear (inner) side 21 of the first fitting 20 at a shaft attachment location, and the arms 12 and 14 extend outwardly from an intermediate side 23 of the first fitting 20. The bolt 28 secures the pedal 10 in place.

The second fitting 22 of the pedal 10 is located above the first fitting 20 to be spaced from the brake actuator 24, and in a line with the first fitting 20 which is substantially perpendicular to the line made by the two arms 12, 14. The rear (inner) side 25 of the second fitting 22 provides an aperture through which a fixing rod 30 can pass, the fixing rod 30 also passing through an aperture 32 in the coupling member 26 and mating with a spring clip 34 so as to fix the coupling member to the pedal 10 at the position of the second fitting 22. The markers 16, 18 of the arms 12, 14 each define an actuation surface aligned along a plane oriented at least substantially perpendicularly to an axis extending between the shaft attachment location where the brake actuator 24 extends from the first fitting 20, and the location at which the coupling member 26 is rotationally coupled to the second fitting 22.

First and second caps 36, 38 snap fit onto the front (outer) sides 19, 27 of the first and second fittings 20, 22 of the pedal 10 to cover the front side of the fittings 20, 22.

Figure 3:
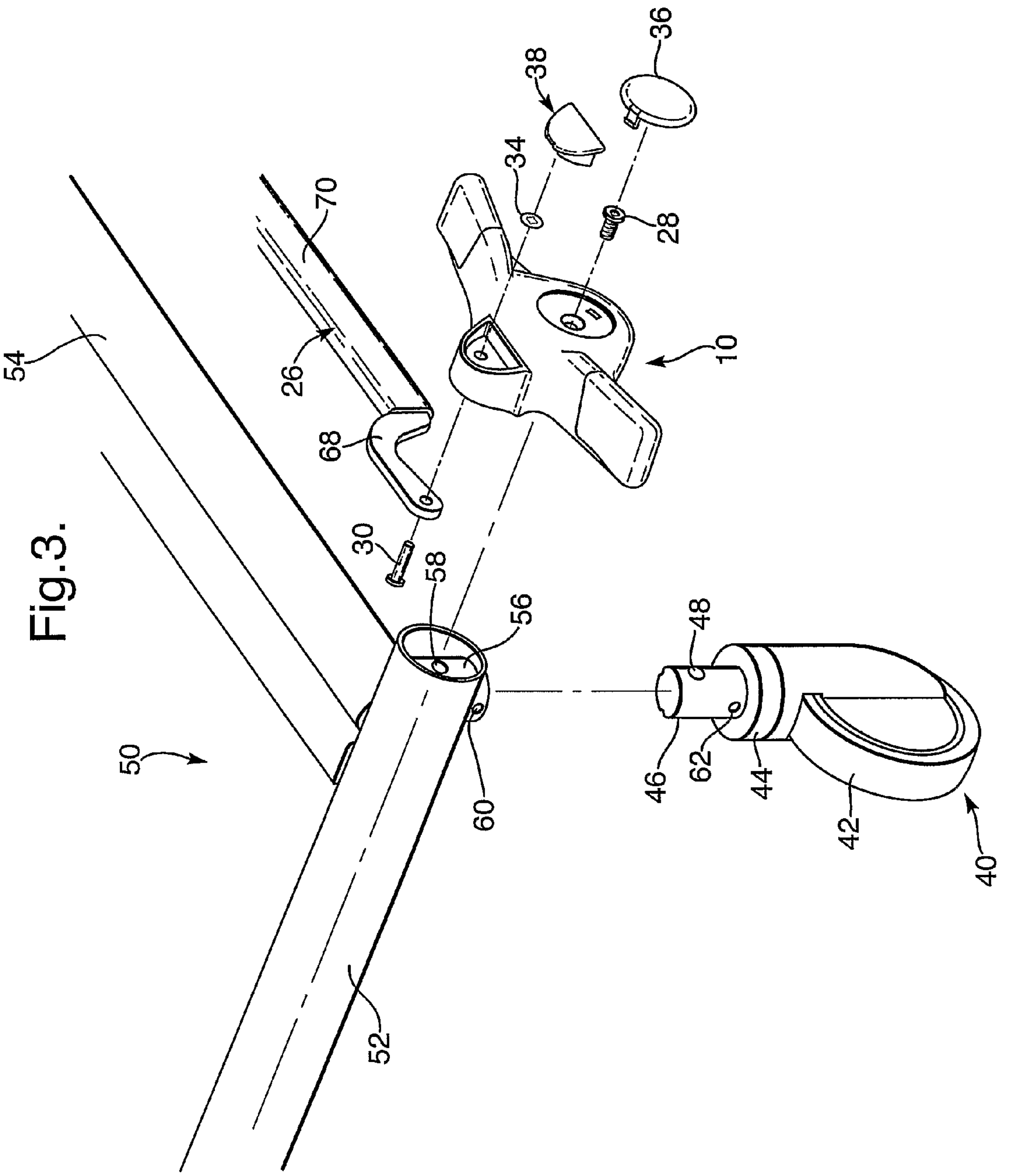
FIG. 3 is a perspective view in exploded form of an embodiment of pedal, brake and castor assembly.

Referring now to FIG. 3, there is shown a preferred embodiment of pedal, brake and castor assembly. A castor 40, of known form, includes a wheel 42, which can rotate about a bushing 44, and a coupling shaft 46. Within the shaft 46 there is provided a cam mechanism and brake pad (both not shown). The brake pad in use can be urged by the cam onto the wheel 42 to stop it moving and can also be released therefrom by opposite rotation of the cam. First and second opposing round apertures 48 (only one of which is seen in FIG. 3) are provided in the shaft 46 and in use receive the actuator rod 24, as is described in further detail below. As is well known, the cam includes an appropriate fitting to receive the actuator rod 24 and in use rotates with rotation of the rod 24 to carry out the cam action which applies or releases the brake pad from engagement with the wheel 42. As this design of castor with integral brake mechanism is well known in the art, it is not described in any further detail herein.

Figure 4:
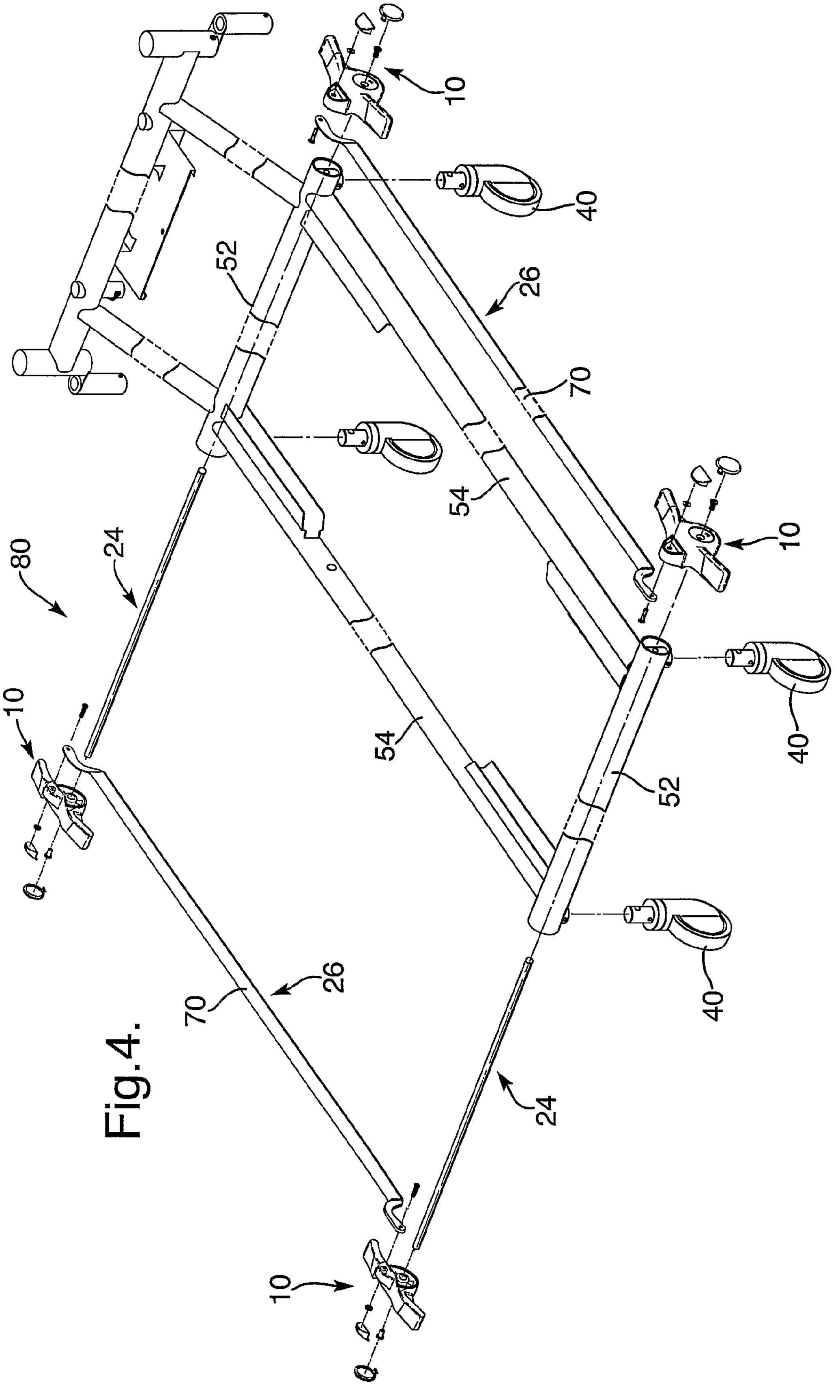
FIG. 4 is a perspective view in exploded form of an embodiment of bed frame assembly including a plurality of the pedal, brake and castor assemblies of FIG. 3.

FIG. 3 also shows a part of a bed frame 50 to which the castor, brake and pedal assembly are fitted. The frame includes a first transverse strut 52 integral with a first longitudinal shut 54. There are typically provided two transverse and two longitudinal struts as shown in FIG. 4. Of course, the struts 52, 54 can be either longitudinal or transverse, which one each is not being important.

The strut 52 is hollow and is provided with a cylindrical fitting 56 opening downwardly. The fitting 56 receives the shaft 46 of the castor 40 and is provided with two opposing round apertures 58 which in use align with the apertures 48 in the castor shaft 46 to allow the actuator rod 24 to pass therethrough and to rotate therein. The cylindrical fitting 56 also includes a hole 60 which aligns with a hole 62 in the castor shaft 46 for receipt of a fixing screw or bolt (not shown).

The pedal 10 fits onto the end of hollow strut 52, such that the rounded internal shoulder 64 (best seen in FIG. 1) overlies the strut 56 and provides for guided rotation of the pedal 10 about the strut 52. The second fitting 22 of the pedal thus also overlies the strut 52, as does the end of the coupling element 26. As will be apparent from FIG. 3 in particular, the coupling element 26 includes a bent bracket element (dogleg end) 68 and a straight elongate intermediate portion 70 extending from the bracket 68. This allows the coupling element 26 to run alongside the strut 54, substantially aligned therewith.

The first fitting 20 is substantially aligned with the centreline of the strut 52 such that depression of one of the arms 12, 14 of the pedal 10 will cause only rotation of the brake actuator rod 24. On the other hand, such rotation will cause the second fixing 22 to move around an arc determined by the distance of the second fitting 22 from the first fitting 20, that is of the radius as measured from the centre point set by the fitting 20. This arcuate movement of the fitting 22 causes a similar movement in the coupling rod 26 which, by virtue of the length of the coupling rod, equates substantially to a lateral translation of the element 26.

FIG. 4 shows an example of a base frame 80 for a bed, in particular a hospital bed. The frame 80 includes longitudinal and transverse struts 52, 54, as per FIG. 3, arranged in a rectangular form, with four castors 40 and four associated pedal assemblies 10. Two actuator rods 24 are provided, one for each pair of opposing pedal assemblies 10, while two connecting elements 26 are provided, one for each pair of side-by-side pedal assemblies 10.

When assembled, all the pedals and thus all the brake mechanisms are coupled to one another through the two actuator rods 24 and two coupling elements 26. When one pedal 10 is turned, by depression of the appropriate arm 12, 14, this causes rotation of the actuator rod 24 fitted thereto which in turn rotates the opposite pedal 10. The rotation of the first pedal 10 also causes, through the translatory movement of the connecting element 26, an equivalent rotation of the pedal lying to the side and thus, through the entire interconnected assembly, similar rotation of all the pedals 10. As the rotation of one pedal 10 will either engage or disengage its associated castor brake in dependence upon the direction of rotation, through its actuator shaft 24, all the castors will either be locked or will all be released by this single operation.

The invention claimed is:

1. A brake assembly for a bed, the brake assembly including:

a. a brake actuator shaft;

b. a pedal having:

(1) a first fitting having:

i. an outer side and an inner side with a first fitting intermediate side extending therebetween, ii. a shaft attachment location provided on the inner side, wherein the brake actuator shaft extends from the pedal at the shaft attachment location, and iii. a strut extending from the inner side of the first fitting, with the brake actuator shaft extending within the strut;

wherein the inner side of the first fitting is concave, and is complementarily and rotationally fit about the outer circumference of one end of the strut;

(2) a second fitting joined to the first fitting at a location spaced from the shaft and the shaft attachment location, the second fitting having an outer side and an inner side with a second fitting intermediate side extending therebetween;

(3) at least one arm extending outwardly from at least one of the first fitting intermediate side and the second fitting intermediate side;

wherein the first fitting, second fitting, and arm are integrally formed as a unitary component;

c. a coupling member rotationally coupled to the second fitting.

2. The brake assembly of claim 1 wherein the second fitting inner side is spaced inwardly from the first fitting inner side, whereby the second fitting intermediate side is situated:

a. adjacent to the outer circumference of the strut, and b. radially spaced from the brake actuator shaft.

3. The brake assembly of claim 2 wherein the coupling member is rotationally coupled to the inner side of the second fitting.

4. The brake assembly of claim 3 wherein:

a. the coupling member includes an elongated intermediate portion and a dogleg end, and b. the dogleg end is rotationally coupled to the inner side of the second fitting, with the elongated intermediate portion extending at least substantially parallel to a radial line extending from the axis of the brake actuator shaft.

5. A brake assembly for a bed, the brake assembly including:

a. a brake actuator shaft;

b. a pedal having:

(1) a first fitting having:

i. an outer side and an inner side with a first fitting intermediate side extending therebetween, ii. a shaft attachment location provided on the inner side, wherein the brake actuator shaft extends from the pedal at the shaft attachment location, and iii. a strut extending from the inner side of the first fitting, with the brake actuator shaft extending within the strut;

(2) a second fitting joined to the first fitting at a location spaced from the shaft and the shaft attachment location, the second fitting having an outer side and an inner side with a second fitting intermediate side extending therebetween;

(3) at least one arm extending outwardly from at least one of the first fitting intermediate side and the second fitting intermediate side;

wherein the first fitting, second fitting, and arm are integrally formed as a unitary component; and c. a coupling member rotationally coupled to the inner side of the second fitting, wherein the second fitting inner side is spaced inwardly from the first fitting inner side, whereby the coupling member is spaced radially outwardly from the outer circumference of the strut.

6. The brake assembly of claim 5 wherein:

a. the coupling member includes an elongated intermediate portion and a dogleg end, and b. the dogleg end is rotationally coupled to the inner side of the second fitting, with the elongated intermediate portion extending at least substantially parallel to a radial line extending from the axis of the brake actuator shaft.

7. The brake assembly of claim 5 wherein the inner side of the first fitting is concave, and is complementarily and rotationally fit about the outer circumference of one end of the strut.

8. The brake assembly of claim 5 wherein:

a. the coupling member includes an elongated intermediate portion and a dogleg end, and b. the dogleg end is rotationally coupled to the inner side of the second fitting, with the elongated intermediate portion extending at least substantially parallel to a radial line extending from the axis of the brake actuator shaft.

9. The brake assembly of claim 5 wherein each arm extends outwardly from the pedal between the first fitting and the second fitting.

10. The brake assembly of claim 9 wherein each arm has an actuation surface aligned along a plane oriented at least substantially perpendicularly to an axis extending between:

a. the shaft attachment location, and b. the location at which the coupling member is rotationally coupled to the second fitting.

11. A brake assembly for a bed, the brake assembly including:

a. first, second, and third pedals, each pedal having:

(1) a first fitting having an outer side and an inner side with a first fitting intermediate side extending therebetween, and a shaft attachment location provided on at least one of the outer side and inner side;

(2) a second fitting joined to the first fitting at a location spaced from the shaft attachment location, the second fitting having an outer side and an inner side with a second fitting intermediate side extending therebetween;

b. a brake actuator shaft extending between:

(1) the inner side of the first fitting of the first pedal at its shaft attachment location, and (2) the inner side of the first fitting of the second pedal at its shaft attachment location;

c. a coupling member including opposing dogleg ends and an elongated intermediate portion, the dogleg ends being rotationally coupled to:

(1) the first pedal at its second fitting, and (2) the third pedal at its second fitting, wherein the elongated intermediate portion is situated radially outwardly from the brake actuator shaft along a plane extending between:

i. the inner side of the first fitting of the first pedal, and ii. the inner side of the first fitting of the second pedal.

12. The brake assembly of claim 11 further including a marker molded over one of the pedals.

13. A brake assembly for a bed, the brake assembly including:

a. a pedal having:

(1) a first fitting having an outer side and an inner side with a first fitting intermediate side extending therebetween, and a shaft attachment location provided on at least one of the outer side and inner side;

(2) a second fitting joined to the first fitting at a location spaced from the shaft attachment location, the second fitting having an outer side and an inner side with a second fitting intermediate side extending therebetween;

(3) at least one arm extending outwardly from at least one of the first fitting intermediate side and the second fitting intermediate side;

wherein the first fitting, second fitting, and arm are integrally formed as a unitary component;

b. a brake actuator shaft extending from the pedal at the shaft attachment location on the inner side of the first fitting;

c. a coupling member rotationally coupled to the second fitting; and d. a marker molded over the pedal.

14. The brake assembly of claim 5 wherein the brake actuator shaft does not extend from the second fitting.

* * * * *